US008850232B2

(12) United States Patent
Priel et al.

(10) Patent No.: US 8,850,232 B2
(45) Date of Patent: Sep. 30, 2014

(54) METHOD FOR PROTECTING A CRYPTOGRAPHIC MODULE AND A DEVICE HAVING CRYPTOGRAPHIC MODULE PROTECTION CAPABILITIES

(75) Inventors: Michael Priel, Hertzelia (IL); Asaf Ashkenazi, Austin, TX (US); Dan Kuzmin, Givat Shmuel (IL); Anton Rozen, Gedera (IL)

(73) Assignee: Freescale Semiconductor, Inc., Austin, TX (US)

( * ) Notice: Subject to any disclaimer, the term of this patent is extended or adjusted under 35 U.S.C. 154(b) by 246 days.

(21) Appl. No.: 12/919,541

(22) PCT Filed: Mar. 19, 2008

(86) PCT No.: PCT/IB2008/051038
§ 371 (c)(1),
(2), (4) Date: Aug. 26, 2010

(87) PCT Pub. No.: WO2009/115864
PCT Pub. Date: Sep. 24, 2009

(65) Prior Publication Data
US 2010/0332851 A1    Dec. 30, 2010

(51) Int. Cl.
*G06F 12/14*        (2006.01)
*G08B 29/00*        (2006.01)
*G06F 21/55*        (2013.01)
*G06F 21/86*        (2013.01)

(52) U.S. Cl.
CPC ............ *G06F 21/558* (2013.01); *G06F 21/554* (2013.01); *G06F 21/86* (2013.01)
USPC .............. 713/193; 713/189; 713/194; 726/34

(58) Field of Classification Search
USPC ............................ 713/189, 193, 194; 726/34
See application file for complete search history.

(56) References Cited

U.S. PATENT DOCUMENTS

| 4,013,902 | A | 3/1977 | Payne |
| 4,040,022 | A | 8/1977 | Takii |
| 4,301,380 | A | 11/1981 | Thomas |
| 4,496,858 | A | 1/1985 | Smith |
| 4,766,567 | A | 8/1988 | Kato |

(Continued)

FOREIGN PATENT DOCUMENTS

| WO | 00/45244 A | 8/2000 |
| WO | 2004/111667 A1 | 12/2004 |

OTHER PUBLICATIONS

Anderson R et al: "Tamper Resistance—A Cautionary Note" Proceedings of the USENIX Workshop of Electronic Commerce, XP000923039, pp. 1-11, Nov. 1, 1996.

(Continued)

*Primary Examiner* — Aravind Moorthy

(57) ABSTRACT

A device and a method for protecting a cryptographic module of which the method includes: estimating a functionality of a circuit that is adapted to malfunction when a physical parameter has a first value different from a nominal parameter value at which the cryptographic module functions correctly. The cryptographic module malfunctions when the physical parameter has a second value different from the nominal parameter value and a difference between the first value and the nominal parameter value being smaller than a difference between the second value and the nominal parameter value. A cryptographic module protective measure is applied if estimating that the circuit malfunctions.

18 Claims, 3 Drawing Sheets

(56) References Cited

U.S. PATENT DOCUMENTS

| | | | |
|---|---|---|---|
| 5,187,389 | A | 2/1993 | Hall et al. |
| 5,196,833 | A | 3/1993 | Kemp |
| 5,199,032 | A | 3/1993 | Sparks et al. |
| 5,440,263 | A | 8/1995 | Fournel et al. |
| 5,495,453 | A | 2/1996 | Wojciechowski et al. |
| 5,594,360 | A | 1/1997 | Wojciechowski |
| 5,619,156 | A | 4/1997 | Jandu |
| 5,619,165 | A | 4/1997 | Fournel et al. |
| 5,814,995 | A | 9/1998 | Tasdighi |
| 5,903,767 | A | 5/1999 | Little |
| 5,920,182 | A | 7/1999 | Migliavacca |
| 6,272,439 | B1 | 8/2001 | Buer et al. |
| 6,531,911 | B1 | 3/2003 | Hsu et al. |
| 6,559,629 | B1 | 5/2003 | Fernald |
| RE38,154 | E | 6/2003 | Moroni et al. |
| 6,661,218 | B2 | 12/2003 | Kim |
| 6,876,250 | B2 | 4/2005 | Hsu et al. |
| 7,274,226 | B2 | 9/2007 | Yoshizawa |
| 7,579,898 | B2 | 8/2009 | Soldera et al. |
| 7,734,440 | B2 | 6/2010 | Hattis |
| 7,839,189 | B2 | 11/2010 | Maltione et al. |
| 7,863,944 | B2 | 1/2011 | Wang et al. |
| 2002/0194017 | A1* | 12/2002 | Post et al. ............................ 705/1 |
| 2003/0149914 | A1 | 8/2003 | Kim |
| 2007/0069875 | A1* | 3/2007 | Doi ................................ 340/440 |
| 2008/0074255 | A1* | 3/2008 | Park et al. ....................... 340/540 |
| 2014/0035560 | A1 | 2/2014 | Olmos et al. |

OTHER PUBLICATIONS

Hagai Bar-El et al: "The Sorcerer's Apprentice Guide to Fault Attacks" Internet Citation, XP002329915, Retrieved from the Internet: URL: http://web.archive.org/web/20041016071838/eprint.iacr.org/2004/100, Retrieved May 27, 2005.

Koemmerling O et al: "Design Principles for Tamper-Resistant Smartcard Processors" USENIX Workshop on Smartcard Technology, pp. 9-20, XP000952208, May 1, 1999.

US Department of Commerce: "Security Requirements for Cryptographic Modules" Federal Information Processing Standards Publications, National Institute of Standards and Technology, FIPS PUB 140-1, Jan. 11, 1994.

International Search Report and Written Opinion correlating to PCT/IB2008/051038 dated Nov. 7, 2008.

Aita, A. et al., "Low-power and accurate operation of a CMOS smart temperature sensor based on bipolar devices and ΣΔ A/D converter," Research in Microelectronics and Electronics Conference, Jul. 2-5, 2007; pp. 133-136.

Aita, A. et al., "Low-Power Operation of a Precision CMOS Temperature Sensor based on Substrate PNPs," IEEE Sensors 2007 Conference, Oct. 28-31,2007; pp. 856-859.

Assaad, M. et al., "Ultra low power, harsh environment SOI-CMOS design of temperature sensor based threshold detection and wake-up IC," IEEE International SOI Conference, Oct. 11-14, 2010; pp. 1-2.

Bakker, A. et al., "Micropower CMOS temperature sensor with digital output," IEEE Journal of Solid-State Circuits, vol. 31, issue 7, Jul. 1996; pp. 933-937.

Dantas, J.M.C. et al., "Low power high-responsivity CMOS temperature sensor," IEEE International Instrumentation and Measurement Technology Conference, May 12-15, 2008; 5 pages.

De Venuto, D. et al., "Low power smart sensor for accurate temperature measurements," 4th IEEE International Workshop on Advances in Sensors and Interfaces, Jun. 28-29, 2011; pp. 71-76.

Djemouai, A. et al., "A 200 MHz frequency-locked loop based on new frequency-to-voltage converters approach," IEEE International Symposium on Circuits and Systems, Jul. 1999; pp. 89-92.

Djemouai, A. et al., "High performance integrated CMOS frequency-to-voltage converter " Proceedings of the 10th International Conference on Microelectronics; Dec. 14-16, 1998; pp. 63-66.

Falconi, C. et al., "Low voltage, low power, compact, high accuracy, high precision PTAT temperature sensor for deep sub-micron CMOS systems," IEEE International Symposium on Circuits and Systems, May 18-21, 2008; pp. 2102-2105.

Kaya, T. et al., "A Low-Voltage Temperature Sensor for Micro Power Harvesters in Silicon-on-Sapphire CMOS " Electronics Letters, vol. 42, No. 9, Apr. 27, 2006; 2 pages.

Lin, C. et al., "Design of frequency-to-voltage converter using successive-approximation technique," Proceedings of the 20th IEEE Instrumentation and Measurement Technology Conference; May 20-22, 2003 pp. 1438-1443.

Lin, Y. et al., "An ultra low power 1V, 220nW temperature sensor for passive wireless applications," IEEE Custom Integrated Circuits Conference, Sep. 21-24, 2008, pp. 507-510.

Liu, Y. et al., "A Low Power Temperature Sensor for Passive RFID Tag," Proceedings of the 2009 12th International Symposium on Integrated Circuits, Dec. 14-16, 2009, pp. 699-702.

Matsumoto, H. et al., "Switched-capacitor frequency-to-voltage and voltage-to-frequency converters based on charge-balancing principle," IEEE International Symposium on Circuits and Systems; Jun. 7-9, 1988; pp. 2221-2224.

Michaelsen, J.A. et al., "A low-voltage low-power frequency-to-voltage converter for VCO feedback linearization," 17th IEEE International Conference on Electronics, Circuits, and Systems, Dec. 12-15, 2010; pp. 1132-1135.

Qian, J., "Design of a 0.8V low power CMOS temperature sensor for RFID-based train axle temperature measurement," 10th IEE International Conference on Solid-State and Integrated Circuit Technology, Nov. 1-4, 2010, 3 pages.

Rossi, C. et al., "Ultra-low power CMOS cells for temperature sensors," SBCCI 2005, Sep. 4-7, 2005; pages 202-206.

Shenghua, Z. et al., "A novel ultra low power temperature sensor for UHF RFID tag chip," IEEE Asian Solid-State Circuits Conference, Nov. 12-14, 2007; pp. 464-467.

Tuthill, M. "A switched-Current, Switched-Capacitor Temperature Sensor in 0.6-um CMOS", IEEE Journal of Solid-State Circuits, Jul. 1998, vol. 33, pp. 1117-1122.

Zhai, Y. et al,. "Detection of on-chip temperature gradient using a 1.5V low power CMOS temperature sensor," IEEE International Symposium on Circuits and Systems, May 21-24, 2006, pp. 1171-1174.

* cited by examiner ated by the cryptographic module. If a circuit malfunction is
METHOD FOR PROTECTING A CRYPTOGRAPHIC MODULE AND A DEVICE HAVING CRYPTOGRAPHIC MODULE PROTECTION CAPABILITIES

FIELD OF THE INVENTION

The present invention relates to a method for protecting a cryptographic module and a device having cryptographic module protection capabilities.

BACKGROUND OF THE INVENTION

Modern mobile and stationary devices apply security measures for various purposes. These security measures can include encrypting or decrypting information. A module (otherwise known as a cryptographic module) can execute these security measures. A cryptographic module can include hardware, software, firmware, or a combination thereof. The cryptographic module is expected to encrypt (or decrypt) information using one or more encryption keys. Typically, a sequence of input signals (an input vector) is encrypted by a cryptographic key to provide an encrypted output (an output vector).

A cryptographic module is usually subjected to various types of attacks. These attacks are aimed to detect how the cryptographic module works and especially to determine the value of an encryption key that is utilized by the cryptographic module.

In September 1996, Boneh, Demillo, and Lipton from Bellcore announced a new type of cryptanalytic attack that exploits computational errors to find cryptographic keys. Their attack is applicable to public key cryptosystems. Later, E. Biham & A. Shamir extended this attack to various secret key cryptosystems such as DES, and AES.

Hardware faults can increase a cipher's vulnerability to cryptanalysis. The ways to exploit a cryptographic module faulty result differ from one cipher to another.

The attack usually includes fault injection and fault exploitation. Fault injection is a process where the attacker intentionally injects a fault at the appropriate time of the cryptographic module operation. Faults can be induced by various manners, including but not limited to subjecting the device to abnormal conditions (high temperature, very low temperatures, supplying a supply voltage level that does not correspond to the frequency of clock signal that is provided to the device, and the like).

Having the ability to introduce computational faults in cryptographic modules is an effective attacking method against cryptographic hardware devices.

Fault analysis attack or differential fault analysis (DFA) attack, uses faulty output of the crypto-engine to extract the secret key it uses to encrypt/decrypt data. Fault analysis attack can involve changing the frequency of a clock signal that is provided to the cryptographic module as well as changing the level of supply voltage that is supplied to the cryptographic module so as to cause the cryptographic module to malfunction.

Fault analysis attack is a "side channel attack." Accordingly, the attack does not obtain the secret key in a direct way but computes the key out of other data it gets. Accordingly, an erasure of the stored key (e.g. stored in the cryptographic module) will not necessarily protect the key as the output already contains key related information.

In order to protect the key, the cryptographic module needs to halt immediately and should not provide any output once an attack attempt is discovered. This can be followed by a key erasure; however, this key erasure is not related to the DFA attack but is done as an action to attempt to attack the system.

SUMMARY OF THE INVENTION

The present invention provides a method and a device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Because the embodiments of are, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The functionality of a cryptographic module is estimated based upon a functionality of a circuit that is expected to malfunction before (at a lower frequency than) the cryptographic module malfunctions. If a circuit malfunction is detected then a cryptographic module protective measure can be applied.

Attacks such as but not limited to one bit failure attacks on a cryptographic module can be prevented by sensing such an attack (especially an unwanted increment of the frequency of the clock signal) before the attack causes a malfunction of the cryptographic module.

The following explanation refers to various frequency thresholds. It is noted that these thresholds can change in response to temperature as well as other ambient conditions. It is expected that these temperature differences affect the circuit and the cryptographic module at substantially the same manner.

Figure 1:
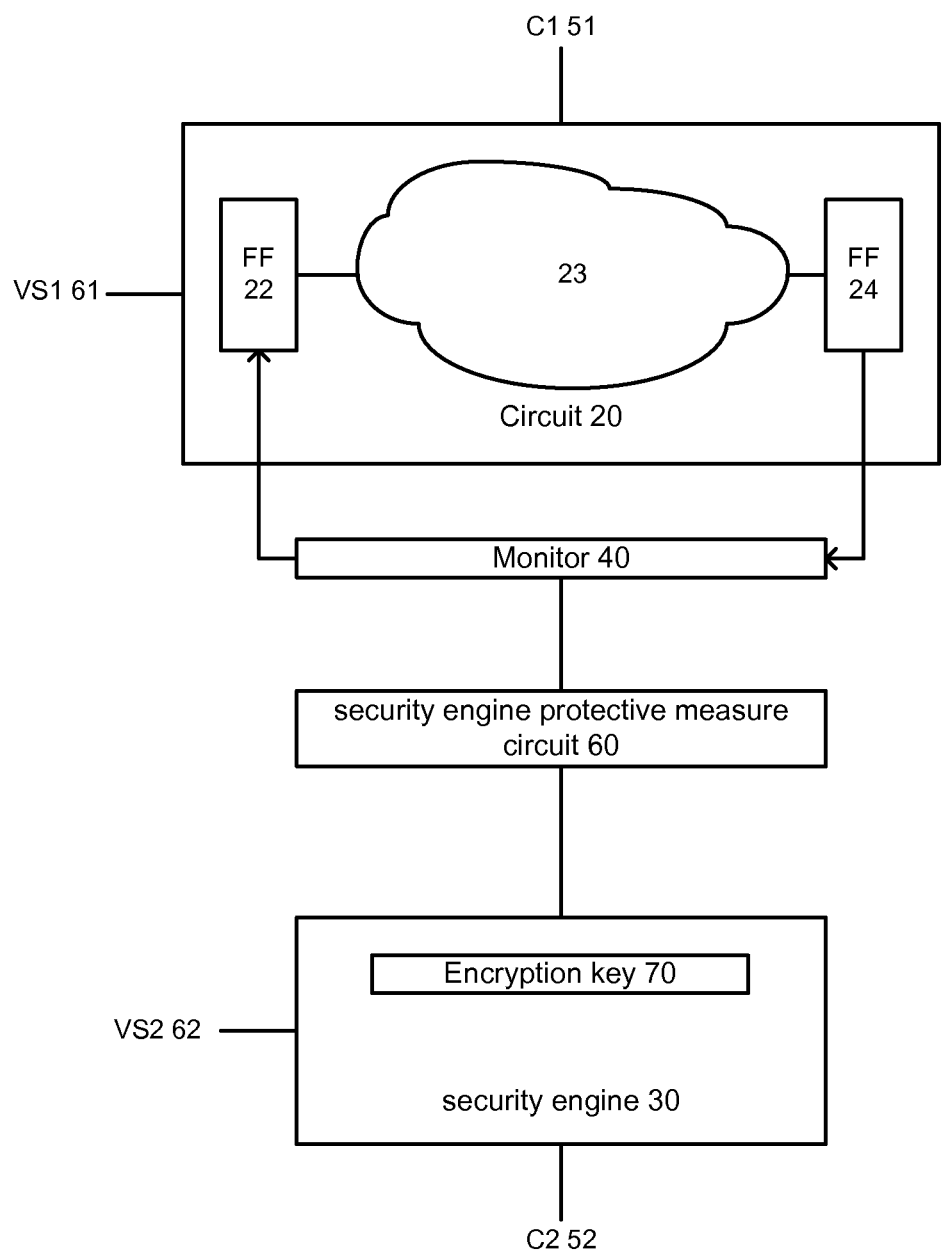
FIG. 1 schematically shows an example of an embodiment of a device.

FIG. 1 schematically shows an example of an embodiment of device 10.

Device 10 includes circuit 20, cryptographic module 30, and monitor 40. Circuit 20 receives first clock signal C1 51 (having a first frequency F1) and first supply voltage SV1 61. Cryptographic module 30 receives second clock signal C2 52 (having a second frequency F2) and second supply voltage SV2 62. The first and second clock signals C1 51 and C2 52 have the same frequency; they can be supplied by the same clock signal source and can even be the same signal. The first and second voltage supply signals V1 and V2 are of the same level, they can be supplied by the same voltage supply unit and can even be the same signal.

Integrated circuits can properly function when they are provided with a voltage supply and a clock signal of values (voltage level, clock signal frequency) that fulfil a certain relationship. As a rule of thumb higher clock signal, frequencies are associated with higher voltage supply levels.

A malfunction can be caused by supplying to cryptographic module 30 a supply voltage of a certain level and also supplying to cryptographic module 30 a clock signal that has a too high frequency—a frequency that is higher than the maximal allowable frequency given the certain level of the supply voltage.

Monitor 40 is connected to circuit 20 and can estimate a functionality of circuit 20. Monitor 40 can also participate in an appliance of a cryptographic module protective measure if it estimates that circuit 20 malfunctions. The participation can include triggering the appliance of a cryptographic module protective measure, or applying at least a portion of the cryptographic module protective measure. For example, device 10 can include cryptographic module protective measure circuit 60 that can apply the cryptographic module protective measure in response to a trigger (also referred to as an indication) from monitor 40.

Device 10 can, for example, erase an encryption key (such as encryption key 70) that is utilized by cryptographic module 30 if monitor 40 estimates that circuit 20 malfunctions. It is noted that FIG. 1 illustrates encryption key 70 as being stored within cryptographic module 30 but this is not necessarily so. It is further noted that the encryption key 70, or at least a portion thereof, can be erased or altered.

Circuit 20 malfunctions before cryptographic module 30 malfunctions. Thus, monitor 40, device 10, (or one of its components) can apply a cryptographic module protective measure before cryptographic module 30 malfunctions.

More in particular, circuit 20 may for example malfunction when being provided with a supply voltage of a first level L1 and a clock signal that has a frequency that exceeds a first frequency threshold FT1. Cryptographic module 30 on the other hand may malfunction only when being provided with a supply voltage of the first level L1 and a clock signal that has a frequency that exceeds a second frequency threshold FT2.

The second frequency threshold FT2 is higher than the first frequency threshold FT1. Thus, circuit 20 malfunctions before cryptographic module 30 malfunctions.

The first frequency threshold (FT1) is set so as to be higher than a nominal operational frequency of the cryptographic module 30 when provided with a supply voltage of the first level L1. This setting prevents monitor 40 from generating false alarms or to apply a cryptographic module protective measure when the appropriate (also termed nominal) supply voltage and clock signal are provided to cryptographic module.

Conveniently, monitor 20 and/or cryptographic module protective measure circuit 60 (if present) can generate an alert if monitor 40 estimates that circuit 20 malfunctions. The alert can be transmitted to a remote location, and e.g. be outputted in a for humans perceptible form, such as to be heard, (or seen) by a user of the device, and the like.

Monitor 40 can evaluate a functionality of circuit 20 by monitoring a progress of a signal through at least a portion of circuit 20. For example, circuit 20 can include a pair of flip-flops 22 and 24 and multiple logic gates (illustrated as logic cloud 23) that are connected between these flip-flops. A data signal expected to be provided to flip flop 22 at a certain clock cycle is expected (if circuit 20 functions properly) to be outputted by flip-flop 24 during the next clock cycle. Monitor 40 can provide a data signal to flip flop 22 on one hand and can monitor the output of second flip-flop 24 on the other hand.

Conveniently, circuit 20 resembles a critical path of the cryptographic module 30 but malfunctions at lower frequencies than the critical path of the cryptographic module 30. Thus, circuit 20 can include substantially the same transistors and perform the same logical function but malfunctions at lower frequencies. This can be obtained by various methods, including but not limited to using transistors that have higher threshold voltages than the corresponding transistors that form the critical path of cryptographic module 40.

Conveniently, monitor 40 measures a delay of circuit 20 in relation to a cycle of the clock signal C1 51. The delay can be measured using suitable known techniques, such as counting the length of the delay by a much faster counter.

It is noted that in some cases cryptographic module 30 operates at a lower frequency (usually for power reduction purposes) than at least one other component of device 10. In this case, circuit 20 should also receive this lower frequency clock signal.

The circuit 20 may in addition or alternatively to voltage or frequency induced malfunctions exhibit a malfunction when another parameter is tampered with. For example, the ambient temperature or the temperature of the circuit 20 itself may cause a malfunction.

Figure 2:
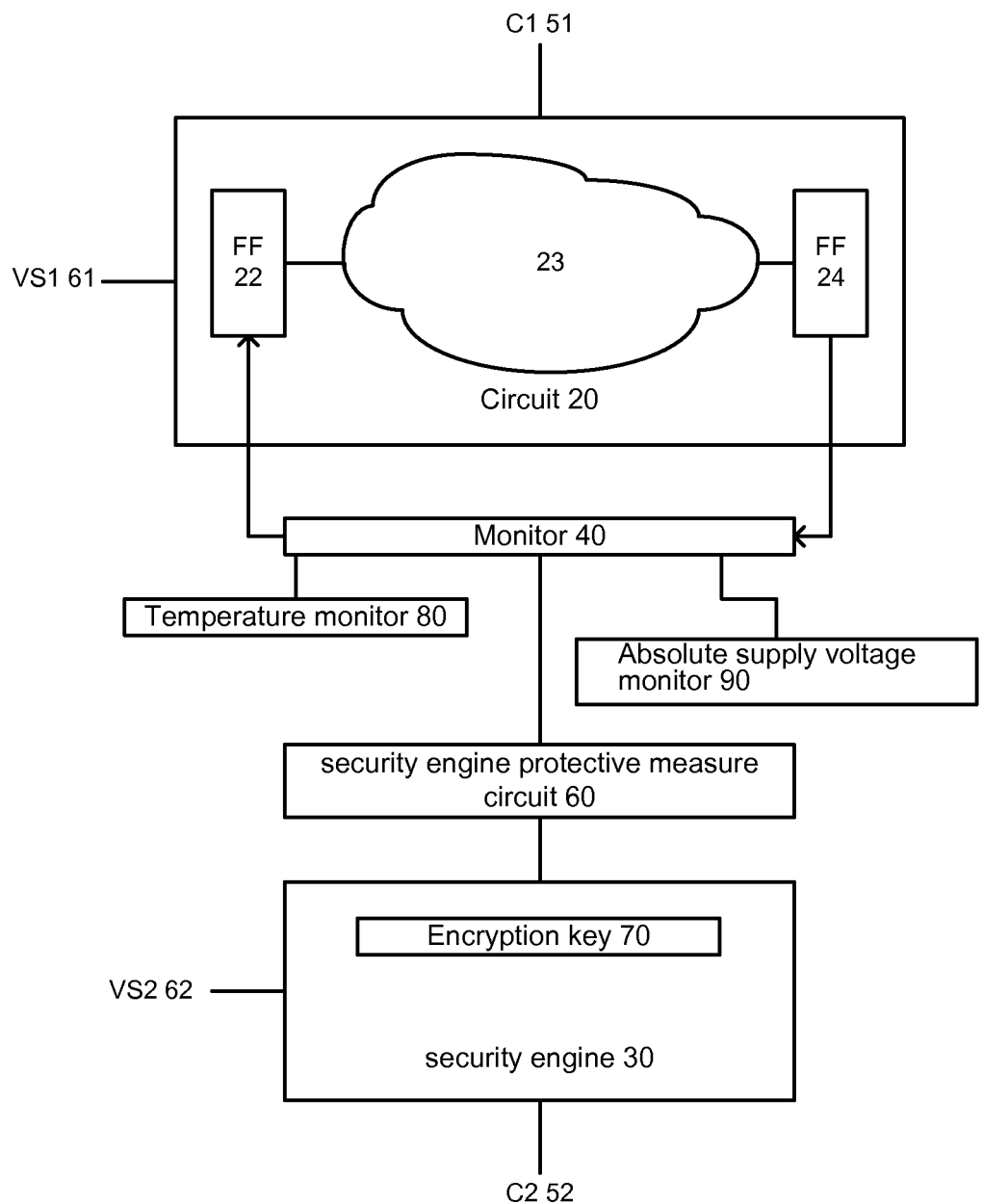
FIG. 2 schematically shows an example of an embodiment of a device.

FIG. 2 schematically shows an example of an embodiment of device 11. Device 11 includes at least one additional monitor (such as temperature monitor 80 and absolute supply voltage monitor 90) that can provide additional indications about (in this example) temperature and supply voltage deviations. Temperature monitor 80 can determine that temperature is outside an allowed temperature range. Absolute supply voltage monitor 90 can determine that a level of a supply voltage is outside an allowed supply voltage level range.

The inputs of each of these monitors can be used in addition to information provided by monitor 40.

Figure 3:
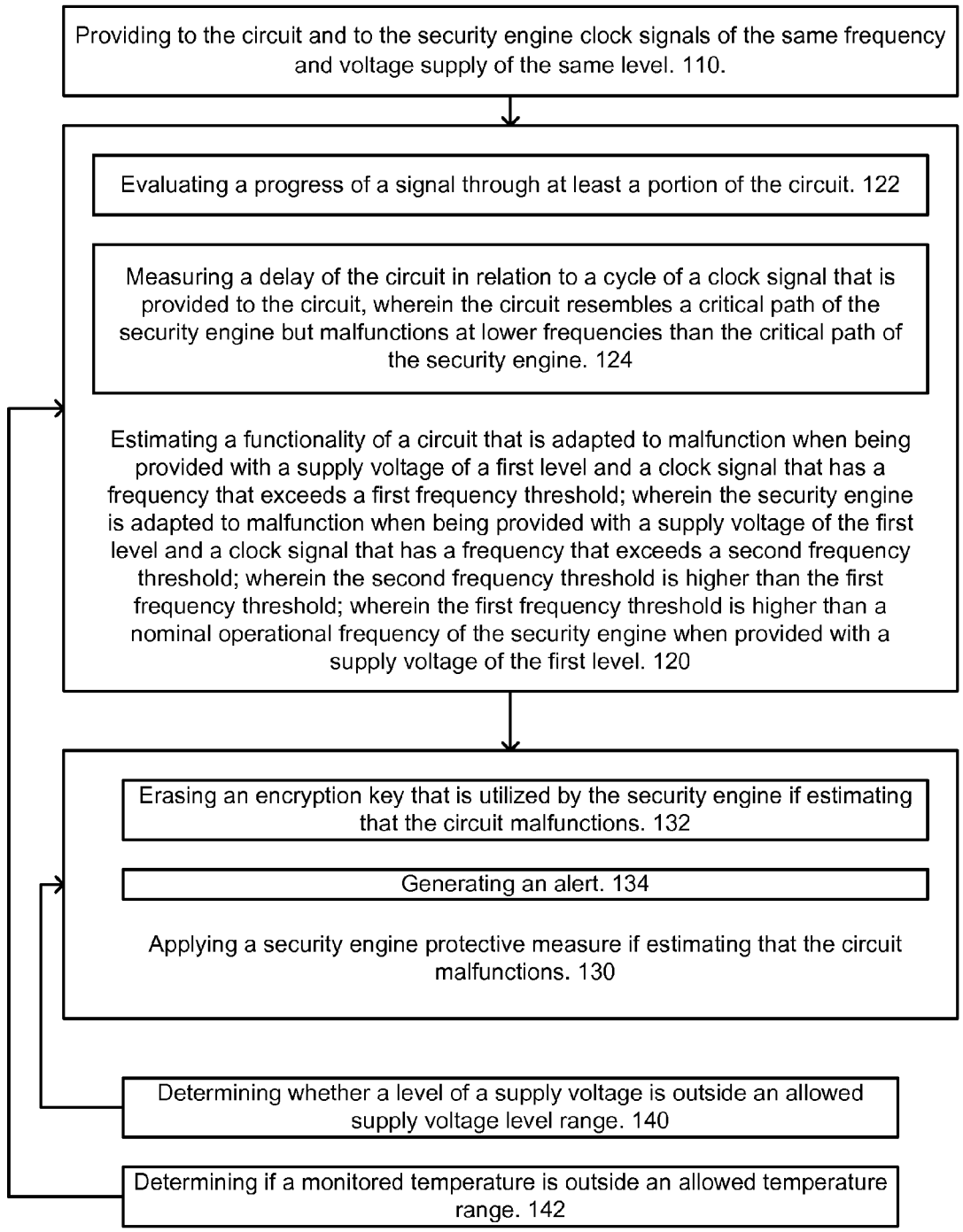
FIG. 3 schematically shows an example of an embodiment of a method for protecting a cryptographic module.

FIG. 3 schematically shows an example of an embodiment of method 100.

Method 100 starts by stage 110 of providing to the circuit and to the cryptographic module clock signals of the same frequency and voltage supply of the same level. It is noted that one or more other components of the integrated circuit that include the circuit and the cryptographic module can receive a higher frequency clock signal.

Stage 110 is followed by stage 120 of estimating a functionality of a circuit that is adapted to malfunction when being provided with a supply voltage of a first level and a clock signal that has a frequency that exceeds a first frequency threshold. The cryptographic module is adapted to malfunction when being provided with a supply voltage of the first level and a clock signal that has a frequency that exceeds a second frequency threshold. The second frequency threshold is higher than the first frequency threshold. The first frequency threshold is higher than a nominal operational frequency of the cryptographic module when provided with a supply voltage of the first level.

Stage 120 can include at least one of the following stages or a combination thereof: (i) stage 122 of evaluating a progress of a signal through at least a portion of the circuit; (ii) stage 124 of measuring a delay of the circuit in relation to a cycle of a clock signal that is provided to the circuit, wherein the circuit resembles a critical path of the cryptographic module but malfunctions at lower frequencies than the critical path of the cryptographic module.

Stage 120 is followed by stage 130 of applying a cryptographic module protective measure if estimating that the circuit malfunctions.

Stage 130 can e.g. include at least one of the following stages or a combination thereof: (i) stage 132 of erasing an encryption key that is utilized by the cryptographic module if estimating that the circuit malfunctions; and (ii) stage 134 of generating an alert.

It is noted that method 100 can also include one or more of the following optional stages: (i) stage 140 of determining whether a level of a supply voltage is outside an allowed supply voltage level range; and (ii) stage 142 of determining if a monitored temperature is outside an allowed temperature range. If one (or both) of the answers to these questions is positive then method 100 can jump to stage 130 (if either one of these changes mandates an appliance of a cryptographic module protective measure) or to stage 120 (if either one of these changes is only a factor in the determination of whether to apply a cryptographic module protective measure).

Although the invention is described herein with reference to specific embodiments, various modifications and changes can be made without departing from the scope of the present invention as set forth in the claims below.

For example, It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

For example, FIG. 1 illustrates device as including cryptographic module protective measure circuit 60 in addition to monitor 40 but this is not necessarily so. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Also, in one embodiment, device 10 may be (a part of) a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Furthermore, the invention may also be implemented in a computer program for running on a computer system, at least including code portions for performing steps of a method according to the invention when run on a programmable apparatus, such as a computer system or enabling a The computer program may be provided on a data carrier, such as a CD-rom or diskette, stored with data loadable in a memory of a computer system, the data representing the computer program. The data carrier may further be a data connection, such as a telephone cable or a wireless connection. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

All or some of the software described herein may be received elements of a programmable system, for example, from computer readable media such as memory or other media on other computer systems. Such computer readable media may be permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. For example, However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for protecting a cryptographic module, the method comprising:
    estimating a functionality of a circuit that is adapted to malfunction when a physical parameter has a first value different from a nominal parameter value at which the cryptographic module functions correctly, the cryptographic module malfunctioning when said physical parameter has a second value different from said nominal parameter value and a difference between said first value and said nominal parameter value being smaller than a difference between said second value and said nominal parameter value, wherein said circuit is provided with a supply voltage of a first level and a clock signal that has a frequency that exceeds a first frequency threshold, wherein the cryptographic module is adapted to malfunction when being provided with a supply voltage of the first level and a clock signal that has a frequency that exceeds a second frequency threshold, wherein the second frequency threshold is higher than the first frequency threshold, wherein the first frequency threshold is higher than a nominal operational frequency of the cryptographic module when provided with a supply voltage of the first level; and
    applying a cryptographic module protective measure if estimating that the circuit malfunctions.

2. The method according to claim 1, wherein the applying comprises erasing an encryption key that is utilized by the cryptographic module if estimating that the circuit malfunctions.

3. The method according to claim 1, wherein the applying comprises generating an alert.

4. The method according to claim 1, wherein the estimating comprises evaluating a progress of a signal through at least a portion of the circuit.

5. The method according to claim 1, wherein the clock signal provided to the circuit has a frequency that is lower than a frequency of a clock signal provided to at least one other component of an integrated circuit that comprises the cryptographic module.

6. The method according to claim 1, comprising applying a cryptographic module protective measure if either one of the following conditions is fulfilled: (i) a level of a supply voltage is outside an allowed supply voltage level range; and (ii) a monitored temperature is outside an allowed temperature range.

7. The method according to claim 1, comprising providing a circuit that resembles a critical path of the cryptographic module but malfunctions at lower frequencies than the critical path of the cryptographic module.

8. The method according to claim 7 comprising measuring a delay of the circuit in relation to a cycle of a clock signal that is provided to the circuit.

9. A computer program product stored on a nontransitory computer readable storage medium, the computer program product including code portions for performing a method as claimed in claim 1 when run on a programmable apparatus.

10. A device having cryptographic module protection capabilities, the device comprises:
    a circuit;
    a cryptographic module; and
    a monitor;
    wherein the circuit malfunctions when a physical parameter has a first value different from a nominal parameter value at which the cryptographic module functions correctly, the cryptographic module malfunctions when said physical parameter has a second value different from said nominal parameter value, a difference between said first value and said nominal parameter value being smaller than a difference between said second value and said nominal parameter value, wherein the circuit malfunctions when being provided with a supply voltage of a first level and a clock signal that has a frequency that exceeds a first frequency threshold, wherein the cryptographic module is adapted to malfunction when being provided with a supply voltage of the first level and a clock signal that has a frequency that exceeds a second frequency threshold, wherein the second frequency threshold is higher than the first frequency threshold, wherein the first frequency threshold is higher than a nominal operational frequency of the cryptographic module when provided with a supply voltage of the first level;
    wherein the monitor estimates a functionality of the circuit and participates in an appliance of a cryptographic module protective measure if estimating that the circuit malfunctions.

11. The device according to claim 10, wherein the device erases an encryption key that is utilized by the cryptographic module if the monitor estimates that the circuit malfunctions.

12. The device according to claim 10, wherein the device erases an encryption key that is utilized by the cryptographic module if the monitor estimates that the circuit malfunctions.

13. The device according to claim 10, wherein device generates an alert if the monitor estimates that the circuit malfunctions.

14. The device according to claim 10, wherein the monitor evaluates a progress of a signal through at least a portion of the circuit.

15. The device according to claim 10, wherein the clock signal provided to the circuit has a frequency that is lower than a frequency of a clock signal provided to at least one other component of an integrated circuit that comprises the cryptographic module.

16. The device according to claim 10, adapted to apply a cryptographic module protective measure if either one of the following conditions is fulfilled: a level of a supply voltage is outside an allowed supply voltage level range; and a monitored temperature is outside an allowed temperature range.

17. The device according to claim 10, wherein the circuit resembles a critical path of the cryptographic module but malfunctions at lower frequencies than the critical path of the cryptographic module.

18. The device according to claim 10, wherein the monitor measures a delay of the circuit in relation to a cycle of a clock signal that is provided to the circuit.

* * * * *